(12) United States Patent
Yang

(10) Patent No.: US 8,838,666 B2
(45) Date of Patent: Sep. 16, 2014

(54) DIVIDER LOGIC CIRCUIT AND IMPLEMENT METHOD THEREFOR

(71) Applicant: Xiu Yang, Chengdu (CN)

(72) Inventor: Xiu Yang, Chengdu (CN)

(73) Assignee: IPGoal Microelectronics (Sichuan) Co., Ltd., Chengdu, Sichuan Province (CN)

(*) Notice: Subject to any disclaimer, the term of this patent is extended or adjusted under 35 U.S.C. 154(b) by 224 days.

(21) Appl. No.: 13/624,819

(22) Filed: Sep. 21, 2012

(65) Prior Publication Data

US 2014/0089372 A1   Mar. 27, 2014

(30) Foreign Application Priority Data

Dec. 2, 2011   (CN) .......................... 2011 1 0394378

(51) Int. Cl.
G06F 7/52   (2006.01)

(52) U.S. Cl.
USPC .......................................................... 708/650

(58) Field of Classification Search
CPC ..... G06F 7/535; G06F 7/5375; G06F 7/4873; G06F 7/5525; G06F 7/4917
USPC .......................................................... 708/650
See application file for complete search history.

(56) References Cited

U.S. PATENT DOCUMENTS 4,881,193 A * 11/1989 Hamada et al. ............... 708/650
7,512,648 B2 * 3/2009 Natarajan et al. ............. 708/653

* cited by examiner

*Primary Examiner* — Tan V. Mai

(57) ABSTRACT

A divider logic circuit for obtaining a quotient S of a dividend M divided by a divisor N, includes a first constant value input terminal, a first adder, a second constant value input terminal, a base number input terminal, at least one integer power device, at least one right shift register, a second adder, and a multiplier; wherein the integer power device determines a first constant value that the base number is $N_1-N$, and the exponent is $i-1$; wherein the right shift registers shift the first constant value to the right for $h*i$-digit for outputting a second constant value; wherein the multiplier multiplies a third constant value by the constant value $M-N*S_1$ for outputting a fourth constant value, wherein the first adder adds up the estimate $S_1$ and the fourth constant value for outputting the quotient S. The present invention also provides an implement method therefor.

8 Claims, 2 Drawing Sheets

DIVIDER LOGIC CIRCUIT AND IMPLEMENT METHOD THEREFOR

BACKGROUND OF THE PRESENT INVENTION

1. Field of Invention

The present invention relates to a digital logic circuit, and more particularly to a single clock divider logic circuit which has high precision and is easy to implement and an implement method therefor.

2. Description of Related Arts

In the design field of digital logic circuits, it is difficult to implement the divider logic circuit, and it is more difficult to implement the divider logic circuit in one clock.

In conventional digital divider logic circuit arts, when a divisor is a standard power value, namely the divisor is an integer power of 2, a quotient is generally obtained by shifting a dividend to the right for corresponding digits. However, when the divisor is not a standard power value, the integer part of the quotient is generally obtained according to the circulate times that the divisor circularly subtracts the dividend, so it is almost impossible to implement the divider logic circuit in one clock. Thus, it is necessary to provide a single clock divider logic circuit which has high precision and is easy to implement and an implement method therefor.

SUMMARY OF THE PRESENT INVENTION

Based on above description, it is necessary to provide a single clock divider logic circuit which has high precision and is easy to implement and an implement method therefor.

A divider logic circuit for obtaining a quotient S of a dividend M divided by a divisor N, comprises a first constant value input terminal for inputting an estimate value $S_1$ of the quotient S, a first adder connected with the first constant value input terminal, a second constant value input terminal for inputting a constant value $M-N*S_1$, a base number input terminal for inputting a base number $N_1-N$, at least one integer power device connected with the base number input terminal, at least one right shift register connected with the integer power device, a second adder connected with the right shift register, and a multiplier connected with the first adder, the second adder and the second constant value input terminal, wherein $N_1$ is a standard power value which is the closest to the divisor N, $N_1=2^h$, wherein h is a natural number, wherein the integer power device determines a first constant value that the base number is $N_1-N$, and the exponent is i-1, wherein i is a natural number, wherein the right shift register shifts the first constant value determined by the integer power device to the right for h*i-digit for outputting a second constant value to the second adder, wherein the multiplier multiplies a third constant value that the second adder outputs by the constant value $M-N*S_1$ inputted by the second constant value input terminal for outputting a fourth constant value to the first adder, wherein the first adder adds up the estimate $S_1$ inputted by the first constant value input terminal and the fourth constant value sent by the multiplier and outputs the quotient S of the dividend M divided by the divisor N.

An implement method for obtaining a quotient S of a dividend M divided by a divisor N, comprises following steps of:

inputting an estimate $S_1$ of the quotient S to a first adder by a first constant value input terminal;

inputting a constant value $M-N*S_1$ to a multiplier by a second constant value input terminal;

inputting a base number $N_1-N$ to an integer power device by a base number input terminal, wherein $N_1$ is a standard power value which is the closest to the divisor N, $N_1=2^h$, wherein h is a natural number;

determining a first constant value that the base number is $N_1-N$, and the exponent is i-1 by the integer power device, wherein i is a natural number;

shifting the first constant value determined by the integer power device to the right for h*i-digit and outputting a second constant value by right shift register;

sending the second constant value that the right shift register outputs to a multiplier by a second adder;

multiplying the second constant value that the second adder receives by the constant value $M-N*S_1$ inputted by a second constant value input terminal for outputting a third constant value to the first adder by the multiplier; and adding the estimate $S_1$ inputted by a first constant value input terminal and the third constant value that the multiplier outputs to the first adder up and outputting the quotient S which is be eager to the value that the dividend M divides by the divisor N by the first adder.

Compared with conventional arts, the divider logic circuit and the implement method therefor of the present invention are capable of obtaining a quotient S of a dividend M divided by a divisor N in one clock, have simple structures, high precision and are easy to implement.

DETAILED DESCRIPTION OF THE PREFERRED EMBODIMENT

Figure 1:
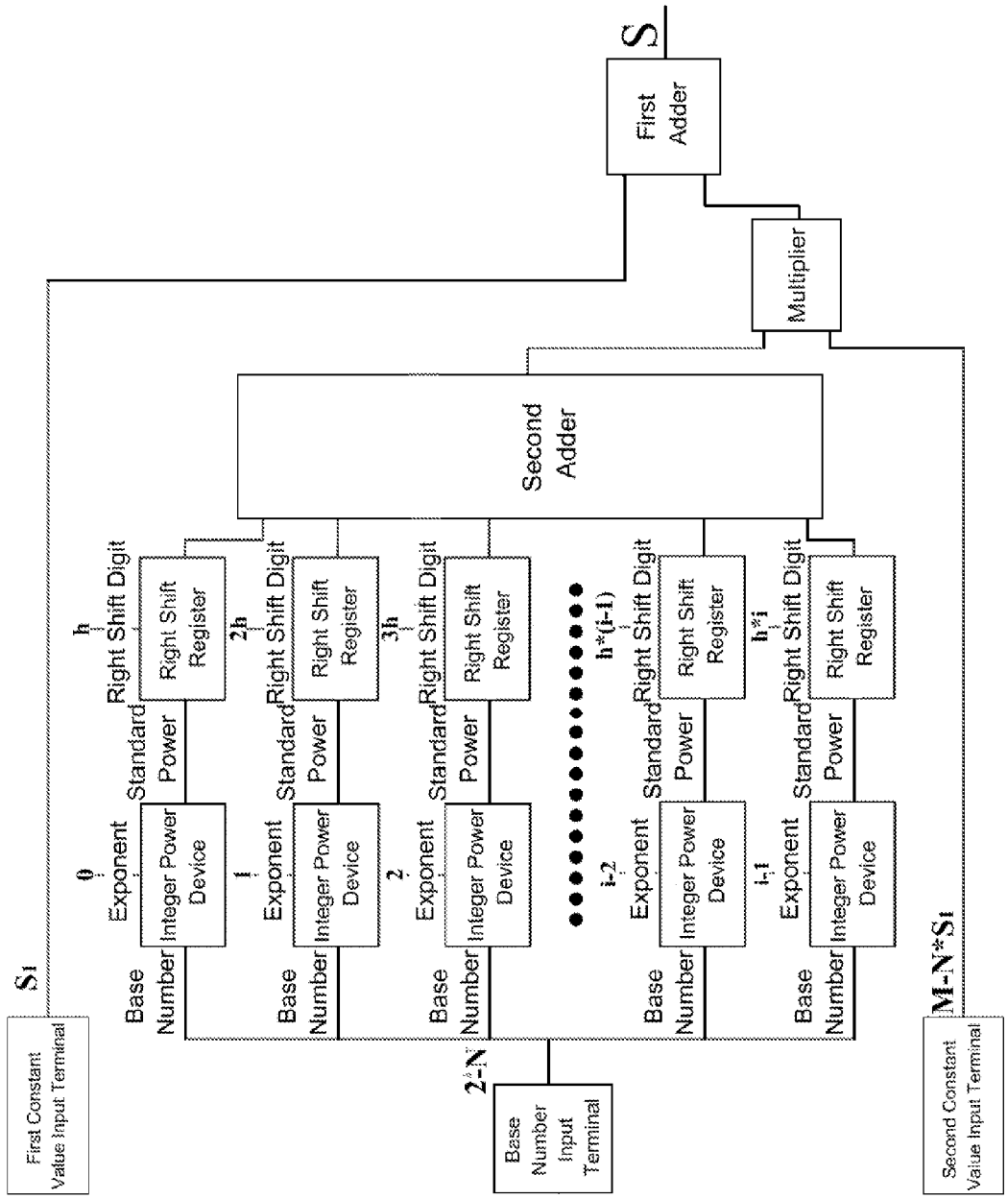
FIG. 1 is a schematic diagram of a logic circuit of a divider logic circuit according to a preferred embodiment of the present invention.

Referring to FIG. 1 of the drawings, a divider logic circuit for obtaining a quotient S of a dividend M divided by a divisor N according to a preferred embodiment of the present invention, comprises a first constant value input terminal, a first adder connected with the first constant value input terminal, a second constant value input terminal, a base number input terminal, a plurality of integer power devices connected with the base number input terminal, a plurality of right shift registers connected with the integer power devices correspondingly, a second adder connected with the right shift registers, and a multiplier connected with the second adder and a second constant value input terminal, wherein the number of the integer power devices and the right shift registers respectively is t, wherein t is a natural number.

The first constant value input terminal is for inputting an estimate $S_1$ of the quotient S; the second constant value input terminal is for inputting a constant value $M-N*S_1$, the base number input terminal for inputting the base number $N_1-N$, wherein $N_1$ is a standard power value which is the closest to the divisor N, $N_1=2^h$, wherein h is a natural number; wherein the several integer power devices respectively determine a plurality of first constant values that the base numbers are $N_1-N$, and the exponents are from 0 to i-1 in turn, wherein i is a natural number; wherein the several right shift registers are for shifting the first constant values determined by the integer power devices to the right from h-digit to h*i-digit for outputting second constant values that the dividends are the first constant values determined by the integer power devices and the divisors are $N_1{}^i$; wherein the second adder is for adding the second constant values that right shift registers output up, outputting a third constant value and then sending the third constant value to the multiplier; wherein the multiplier is for multiplying the third constant value that the second adder outputs by the constant value M−N*$S_1$, outputting a fourth constant value and then sending the fourth constant value to the first adder; wherein the first adder is for adding the estimate $S_1$ and the fourth constant value up and then outputting the quotient S of a dividend M divided by a divisor N.

Working principles of the divider logic circuit according to the preferred embodiment of the present invention are as follows.

In the expression S=M/N, wherein M and N are known values, a quotient S is outputted according to M and N; first, an estimate $S_1$ of the quotient is provided, wherein $N_1$ is a standard power value which is the closest to the divisor N, $S_T$ is assumed to be the quotient at the same time, according to the divider logic circuit, it is obtained an expression of $S_T$ that:

$$S_T = S_1 + \sum_{i=1}^{t} \frac{(N_1 - N)^{i-1} * (M - N * S_1)}{N_1^i}$$

And according to the expression of $S_T$, it is obtained that:

$$\Delta S = S - S_T = \frac{(N_1 - N)^t * (M - N * S_1)}{N_1^t * N}$$

It follows that:
(1) the closer the estimate $S_1$ and the quotient S are, the smaller an error $\Delta S$ is;
(2) the closer the standard power value $N_1$ and the divisor N are, the larger the number of the integer power devices and the right shift registers, t, is, namely the larger the number of a correction factor t is, the smaller an error $\Delta S$ is.

According to the expression of $S_T$, each parameter of $S_T$ is capable of being implemented by the divider logic circuit, so $S_T$ is capable of being obtained at one clock according to the precision requirement and selecting the proper $S_1$, $N_1$ and t. When the error $\Delta S$ is so small that $S_T$ is almost equal to S, namely the constant value that the first adder outputs is equal to the quotient S of a dividend M divided by a divisor N.

For example, when S is expected to be obtained by the expression S=M/125 through a divider logic circuit, S is estimated to be about 450, the standard power value is assumed to be 128, and the number of the correction factor t is 3, the expression of $S_T$ will be:

$$S_T = 450 + \frac{M - 125 * 450}{128} + $$
$$\frac{(128 - 125) * (M - 125 * 450)}{128 * 128} + \frac{(128 - 125)^2 * (M - 125 * 450)}{128 * 128 * 128} =$$
$$450 + (M - 125 * 450) * \left(\frac{1}{128} + \frac{3}{128^2} + \frac{9}{128^3}\right) =$$
$$450 + (M - 56250) * \frac{16777}{2097152}$$

When $M = 56250, S = M/125 = 450;$ $S_T = 450 + (M - 56250) * \frac{16777}{2097152} = 450;$ When $M = 56200, S = M/125 = 449.6;$ $S_T = 450 + (M - 56250) * \frac{16777}{2097152} = 449.600005;$ When $M = 52000,$ $S = M/125 = 416;$ $S_T = 450 + (M - 56250) * \frac{16777}{2097152} = 416.000438;$ When $M = 60000,$ $S = M/125 = 480;$ $S_T = 450 + (M - 56250) * \frac{16777}{2097152} = 479.999614;$ It follows that, the constant value obtained by the preferred embodiment of the present invention, has high precision, and is easy to implement.

Figure 2:
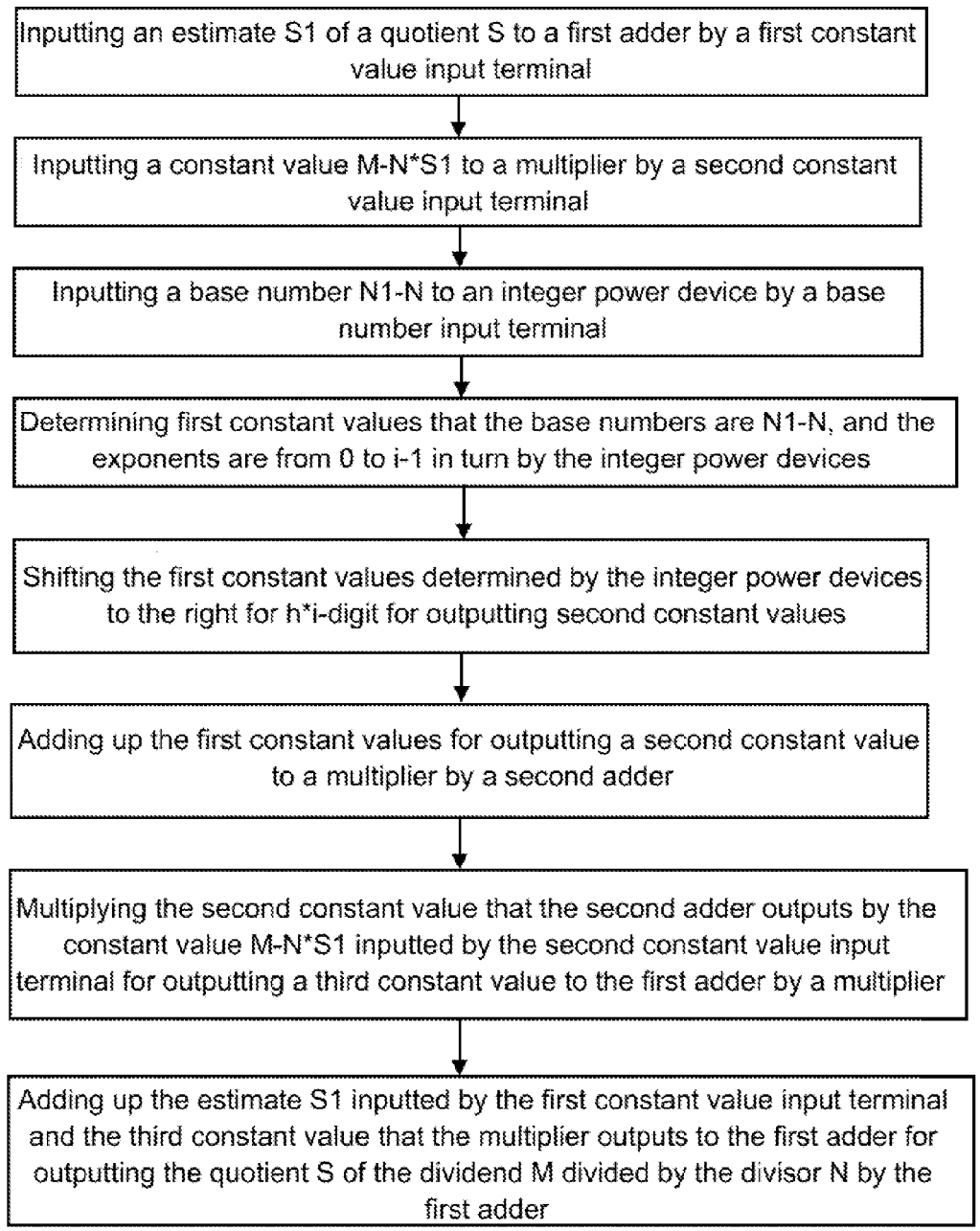
FIG. 2 is a flowchart of an implement method of the divider logic circuit according to a preferred embodiment of the present invention.

Referring to FIG. 2 of the drawings, a divider logic circuit for obtaining a quotient S of a dividend M divided by a divisor N according to a preferred embodiment of the present invention, comprises:

step one of, inputting an estimate $S_1$ of the quotient S to a first adder by a first constant value input terminal;

step two of, inputting a constant value M−N*$S_1$ to a multiplier by a second constant value input terminal;

step three of, inputting a base number $N_1$−N to an integer power device by a base number input terminal, wherein $N_1$ is a standard power value which is the closest to the divisor N, $N_1=2^h$, wherein h is a natural number;

step four of, determining first constant values that the base numbers are $N_1$−N, and the exponents are from 0 to i−1 in turn by the integer power devices, wherein i is a natural number;

step five of, shifting the first constant values determined by the integer power devices to the right for h*i-digit for outputting second constant values that the dividends are the first constant values determined by the integer power devices and the divisors are $N_1^i$ by the right shift registers, wherein h is a natural number;

step six of, adding up the first constant values for outputting a second constant value to a multiplier by a second adder;

step seven of, multiplying the second constant value that the second adder outputs by the constant value M−N*$S_1$ inputted by the second constant value input terminal for outputting a third constant value to the first adder by a multiplier; and step eight of, adding up the estimate $S_1$ inputted by the first constant value input terminal and the third constant value that the multiplier outputs to the first adder for outputting the quotient S of the dividend M divided by the divisor N by the first adder.

wherein the number of the integer power devices and the right shift registers respectively is t, wherein t is a natural number, and the value of t is relatively large.

The divider logic circuit and the implement method therefor of the present invention is capable of being obtained a quotient S of a dividend M divided by a divisor N in one clock, have simple structures, high precision and are easy to implement.

What is claimed is:

1. A divider logic circuit for obtaining a quotient S of a dividend M divided by a divisor N, comprising:
a first constant value input terminal for inputting an estimate value $S_1$ of the quotient S;
a first adder connected with said first constant value input terminal;
a second constant value input terminal for inputting a constant value $M-N*S_1$;
a base number input terminal for inputting a base number $N_1-N$;
at least one integer power device connected with said base number input terminal;
at least one right shift register connected with said integer power device;
a second adder connected with said right shift register, and
a multiplier connected with said first adder, said second adder and said second constant value input terminal, wherein $N_1$ is a standard power value which is the closest to said divisor N, $N_1=2^h$, wherein h is a natural number, wherein said integer power device determines a first constant value that said base number is $N_1-N$, and an exponent is i-1, wherein i is a natural number, wherein said right shift register shifts said first constant value determined by said integer power device to the right for h*i-digit for outputting a second constant value to said second adder, wherein said multiplier multiplies a third constant value that said second adder outputs by said constant value $M-N*S_1$ inputted by said second constant value input terminal for outputting a fourth constant value to said first adder, wherein said first adder adds up said estimate $S_1$ inputted by said first constant value input terminal and said fourth constant value sent by said multiplier and outputs said quotient S of said dividend M divided by said divisor N.

2. The divider logic circuit, as recited in claim 1, wherein the number of said integer power devices and said right shift registers respectively is t, wherein t is a natural number.

3. The divider logic circuit, as recited in claim 2, wherein said several integer power devices determine a plurality of first constant values that the base numbers are $N_1-N$, and the exponents are from 0 to i-1 in turn.

4. The divider logic circuit, as recited in claim 3, wherein said several right shift registers respectively shift said first constant values determined by said several integer power devices to the right from h-digit to h*i-digit for outputting a plurality of second constant values that said dividends are said first constant values determined by said integer power devices and said divisors are $N_1^i$.

5. A implement method for a divider logic circuit, comprising following steps of:
inputting an estimate $S_1$ of a quotient S to a first adder by a first constant value input terminal;
inputting a constant value $M-N*S_1$ to a multiplier by a second constant value input terminal;
inputting a base number $N_1-N$ to an integer power device by a base number input terminal, wherein $N_1$ is a standard power value which is the closest to said divisor N, $N_1=2^h$, wherein h is a natural number;
determining a first constant value that said base number is $N_1-N$, and an exponent is i-1 by said integer power device, wherein i is a natural number;
shifting said first constant value determined by said integer power device to the right for h*i-digit for outputting a second constant value by said right shift register;
sending said second constant value outputted by the right shift register to a multiplier by a second adder;
multiplying said second constant value that said second adder receives by said constant value $M-N*S_1$ inputted by said second constant value input terminal for outputting a third constant value to said first adder by said multiplier; and adding up said estimate $S_1$ inputted by said first constant value input terminal and said third constant value that said multiplier outputs to said first adder for outputting said quotient S of a dividend M divided by a divisor N by said first adder.

6. The implement method, as recited in claim 5, wherein the number of said integer power devices and said right shift registers respectively is t, wherein t is a natural number, wherein each said integer power device is connected with said base number input terminal, said right shift registers are one-to-one correspond with said integer power devices.

7. The implement method, as recited in claim 6, wherein said integer power devices determine said first constant values that said base numbers are $N_1-N$, and said exponents are from 0 to i-1 in turn.

8. The implement method, as recited in claim 6, wherein said right shift registers respectively shift said first constant values determined by said integer power devices to the right from h-digit to h*i-digit for outputting said second constant values that said dividends are said first constant values determined by said integer power devices and said divisors are $N_1^i$.

* * * * *